(12) United States Patent
Saunders et al.

(10) Patent No.: US 7,577,714 B2
(45) Date of Patent: *Aug. 18, 2009

(54) MEDIA STREAMING OF WEB CONTENT DATA

(75) Inventors: Richard William Saunders, Lake Forest Park, WA (US); Ian Cameron Mercer, Sammamish, WA (US); James Morris Alkove, Woodinville, WA (US); Mei L. Wilson, Redmond, WA (US); Brian Crites, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/464,450

(22) Filed: Aug. 14, 2006

(65) Prior Publication Data

US 2006/0288113 A1 Dec. 21, 2006

Related U.S. Application Data

(63) Continuation of application No. 10/223,930, filed on Aug. 20, 2002, now Pat. No. 7,290,057.

(51) Int. Cl.
*G06F 15/16* (2006.01)
*G06F 15/173* (2006.01)
(52) U.S. Cl. ................... 709/213; 709/217; 709/219; 709/223
(58) Field of Classification Search ............. 709/217, 709/219, 223, 231
See application file for complete search history.

(56) References Cited

U.S. PATENT DOCUMENTS 5,642,152 A 6/1997 Douceur et al.
5,708,845 A 1/1998 Wistendahl et al.
5,867,230 A * 2/1999 Wang et al. .............. 348/425.2
5,953,506 A 9/1999 Kalra et al.
6,041,345 A 3/2000 Levi et al.
6,055,577 A 4/2000 Lee et al.
6,081,299 A 6/2000 Kesselring
6,173,317 B1 1/2001 Chaddha et al.
6,195,088 B1 2/2001 Signes
6,230,172 B1 5/2001 Purnaveja et al.

(Continued)

FOREIGN PATENT DOCUMENTS

WO 01/028222 A2 4/2001
WO 03/023781 A1 3/2003

OTHER PUBLICATIONS

Rehm, "Representing Internet Streaming Media Metadata Using MPEG-7 Multimedia Description Schemes," International Multimedia Conference, Proceedings of the 2000 ACM Workshops on Multimedia, 2000, pp. 93-98, ACM Press, New York, USA.

(Continued)

*Primary Examiner*—Ario Etienne
*Assistant Examiner*—Sargon N Nano
(74) *Attorney, Agent, or Firm*—Senniger Powers LLP

(57) ABSTRACT

Methods for streaming web content data via a computer-readable medium. The web content data comprises one or more media samples. The media samples are encoded in a streaming media format as a web component stream. The web component stream is combined with other component streams comprising additional data other than web content data into a presentation stream. The presentation stream is transmitted via a media server to a client. Rendering commands, which are included in one or more rendering samples encoded in the web component stream along with the media samples, coordinate synchronization between the media samples and the additional data when the client renders the presentation stream.

11 Claims, 8 Drawing Sheets

U.S. PATENT DOCUMENTS

| | | | |
|---|---|---|---|
| 6,269,394 | B1 | 7/2001 | Kenner et al. |
| 6,317,795 | B1 | 11/2001 | Malkin et al. |
| 6,389,473 | B1 * | 5/2002 | Carmel et al. ............... 709/231 |
| 6,415,326 | B1 | 7/2002 | Gupta et al. |
| 6,442,550 | B1 | 8/2002 | Rajamony |
| 6,456,591 | B1 | 9/2002 | Mishra |
| 6,460,086 | B1 | 10/2002 | Swaminathan et al. |
| 6,516,356 | B1 | 2/2003 | Belknap et al. |
| 6,609,253 | B1 * | 8/2003 | Swix et al. ................... 725/88 |
| 6,754,905 | B2 | 6/2004 | Gordon et al. |
| 6,772,217 | B1 * | 8/2004 | Baumann et al. ............ 709/232 |
| 6,792,449 | B2 * | 9/2004 | Colville et al. .............. 709/215 |
| 6,856,997 | B2 | 2/2005 | Lee et al. |
| 6,865,609 | B1 * | 3/2005 | Gubbi et al. ................. 709/230 |
| 6,868,452 | B1 * | 3/2005 | Eager et al. ................. 709/231 |
| 6,877,134 | B1 * | 4/2005 | Fuller et al. ................. 715/202 |
| 6,894,973 | B1 | 5/2005 | Mishra |
| 6,898,285 | B1 | 5/2005 | Hutchings et al. |
| 6,904,463 | B1 * | 6/2005 | Fadel .......................... 709/236 |
| 6,910,078 | B1 * | 6/2005 | Raman et al. ............... 709/231 |
| 6,934,752 | B1 | 8/2005 | Gubbi |
| 6,954,739 | B1 | 10/2005 | Bouillet et al. |
| 6,978,306 | B2 | 12/2005 | Miller et al. |
| 7,047,309 | B2 | 5/2006 | Baumann et al. |
| 7,058,720 | B1 * | 6/2006 | Majidimehr ................ 709/231 |
| 7,072,908 | B2 | 7/2006 | Dideriksen et al. |
| 7,177,323 | B2 | 2/2007 | Yavatkar et al. |
| 7,218,635 | B2 | 5/2007 | Haddad |
| 2002/0026645 | A1 | 2/2002 | Son et al. |
| 2002/0054742 | A1 * | 5/2002 | Shimotakahara et al. .... 385/123 |
| 2002/0138619 | A1 | 9/2002 | Ramaley et al. |
| 2002/0138641 | A1 | 9/2002 | Taylor et al. |
| 2002/0172377 | A1 | 11/2002 | Dideriksen et al. |
| 2003/0036948 | A1 | 2/2003 | Woodward et al. |
| 2003/0043847 | A1 | 3/2003 | Haddad |
| 2003/0043919 | A1 | 3/2003 | Haddad |
| 2003/0164845 | A1 | 9/2003 | Fayan et al. |
| 2003/0236902 | A1 * | 12/2003 | Weiss et al. ................. 709/231 |
| 2004/0167890 | A1 | 8/2004 | Eyal |
| 2005/0081159 | A1 | 4/2005 | Gupta et al. |
| 2006/0015574 | A1 * | 1/2006 | Seed et al. ................... 709/219 |
| 2006/0088057 | A1 | 4/2006 | Gummalla et al. |
| 2006/0265512 | A1 | 11/2006 | Allen |

OTHER PUBLICATIONS

Page, et al., "It's About Time: Link Streams as Continuous Metadata," Proceedings of the Twelfth ACM Conference on Hypertext and Hypermedia, 2001, pp. 93-102, ACM Press, New York, USA.

Schmitz, "Multimedia Meets Computer Graphics in SMIL2.0: A Time Model for the Web," Proceedings of the Eleventh International Conference on World Wide Web, May 2002, pp. 45-53, ACM Press, New York, USA.

James et al., "A Streamlined System for Building Online Presentation Archives Using SMIL," Proceedings of the Australian Computing Education Conference, 2000, pp. 145-153, ACM Press, New York, USA.

Li et al., "Active Gateway: A Facility for Video Conferencing Traffic Control," IEEE Computer Software and Applications Conference, Aug. 13-15, 1997, pp. 308-311.

* cited by examiner

MEDIA STREAMING OF WEB CONTENT DATA

TECHNICAL FIELD

The present invention relates to the field of media streaming. In particular, this invention relates to a method for streaming web content data such as hypertext markup language (HTML) pages and images.

BACKGROUND OF THE INVENTION

Conventional mechanisms for delivering web content data such as HTML pages or images to a client machine for viewing involve pulling the web content data (e.g., HTML pages, images, or script) from a web server when they are needed for display on the screen of the client machine. For the viewing experience of the client, this can result in components of the web content data not being available at the correct time (e.g., an image not yet completely downloaded at a time prescribed by the content author for display). Moreover, requests for such web content data come in bursts, resulting in spikes in network bandwidth demand when such data is being delivered over a network. Furthermore, such conventional pull-down mechanisms for web presentations lack synchronization and timing between multiple components of the presentation such as audio, video, and images. Synchronization and timing between multiple components of the presentation are very difficult and present many authoring, timing, and delivery issues. As an example, web content data is delivered through a web server whereas audio and video content is delivered in one or more separate streams through a separate streaming server. As a result, the content author would have to invest a substantial amount of time and effort to present the various types of content together in a synchronized manner to the client machine. As another examples, the conventional pull-down mechanisms generally allocate the fullest server bandwidth available for the downloading or pulling of web content data. As a result, there is no idle bandwidth available for the delivery of audio and video data, and audio and video data may not be delivered on time for synchronous playback with web content data.

Delivering web content data in this conventional mechanism as a "real time" or "live" presentation (i.e., as a presentation occurs) can be especially problematic. In a typical live presentation of web content data such as slides and images, the web content data either need to be delivered ahead before the live presentation begins or are pulled from the web server as the live presentation is being conducted. In such cases, every flip or trigger of the web content data can cause numerous pulling requests or hits to the web server, thus requiring the web server to have higher bandwidth capacity. Therefore, there is a need for delivering web content data in a single multicast stream bandwidth that is managed throughout its delivery and with lower bandwidth usage and costs. Moreover, there is a need for a tool that enables a content author to synchronously present web content data to a client.

In the past, some proprietary implementations provided split-trigger mechanisms that trigger web content data into different frames within an HTML page to achieve the appearance of streamed multimedia delivery. Nevertheless, such implementations may still cause sudden pulling requests that result in higher aggregate bandwidth and incoherence between multiple components of a presentation during seeking (e.g., skip, pause, fast forward, and fast rewind) operations. Other proprietary implementations such as HTML+TIME, even though provided synchronization between multiple components of a presentation, did not support streamed multimedia delivery and dynamic insertion of web content data for "real time" or "live" presentations. Furthermore, enhanced television-programming implementations such as ATVEF, even though provided streamed multimedia delivery and tools for authoring live presentations, did not provide mechanisms to avoid data loss over lossy transport. In addition, these enhanced television-programming implementations did not allow seeking capabilities that enhance the overall viewing experience of a client.

Some other streaming techniques have supported partial synchronization between multiple pieces of media. For example, some proprietary implementations such as SMIL have streamed text and images synchronized with audio and video. However, there is a need for an implementation that supports streaming of web content data such as HTML pages. Furthermore, these prior streaming techniques did not provide for a single stream or single file implementation that allows scalability and smooth synchronization between multiple components. For example, certain proprietary steaming techniques delivered image data in one stream, text in another stream, audio and video data in yet other separate streams, and then attempted to synchronize all these data on a client machine. Such implementations did not provide effective synchronization and smooth delivery.

For these reasons, streaming web content data in a single managed stream or single file implementation via a single media server is needed to address one or more of these and other disadvantages.

SUMMARY OF THE INVENTION

The invention includes a data schema for packaging web content data and for delivering the packaged data over a network to a client machine. In particular, the invention addresses the problems of efficient delivery and timing in several ways. First, the invention allows a content author to package web content data into a single synchronized web component stream and time line. In addition, the invention facilitates the content author to encode the web content data for efficient delivery for the bandwidth and topology of a given network. As a result of the invention, web content data is streamed over a network for efficient, metered delivery. Finally, synchronized playback of the web content data with other media such as audio and video data can be conducted at a client machine.

Through the invention, authoring of web-based presentation into a presentation stream or presentation file that synchronizes the delivery and playback of individual media components along a common time line is enabled. Having a presentation stream or presentation file enables delivery and playback synchronization, seeking, and portability that is much more effective than using the conventional pulling mechanisms. In addition, the invention allows efficient delivery of web-based presentation for unicast, multicast, or file delivery. The invention also allows bandwidth sensitive, metered delivery over a network or from a file system device. Finally, the invention enables playback of synchronized web-based presentation by synchronizing web content data, audio, video, and other media content in a presentation stream or presentation file.

Some key uses of this invention include, but are not limited to, corporate training, product demonstration, and distance learning. Furthermore, the invention enables multicast live streaming, unicast live streaming, and unicast on-demand streaming from a media server via a local area network (LAN), wide area network (WAN), or remote dial-up connection; navigation to sections of a presentation by an end viewer; and archived presentation that is available for streaming after the fact or for download to local devices for mobile playback. However, the flexible implementation of the invention can be used for general delivery of any content (e.g., documents, content, or software) to a client machine.

In accordance with one aspect of the invention, a data field is encoded in a data signal for transmission over a communications channel. The data field includes web content data in a streaming media format. The web content data comprises a web component stream. The web component stream further comprises a media sample.

In accordance with another aspect of the invention, a method authors and encodes a web component stream that comprises a media sample. The method includes setting a rendering time for the media sample. The method also includes setting a pre-roll time for the media sample. The method further includes formatting the media sample into a web component stream as a function of the set rendering time and the set pre-roll time.

In accordance with yet another aspect of the invention, a method renders a web component stream. The method includes receiving the web component stream from a computer-readable medium. The method also includes retrieving a media sample from the web component stream. The method further includes rendering the media sample.

In accordance with yet another aspect of the invention, a method serves a web component stream. The method includes receiving the web component stream. The method also includes receiving a playback request from a client for the web component stream. The method further includes delivering the web component stream to the client in a single stream and/or a single file implementation.

In accordance with yet another aspect of the invention, a method streams web content data from a first computer to a second computer connected to the first computer via a media server. The method includes encoding on the first computer, web content data that comprises a media sample into a web component stream and combining and/or grouping the web component stream, along with any other component stream comprising additional data other than web content data, into a presentation stream and/or a presentation file. The method also includes delivering the presentation stream and/or the presentation file from the first computer to the media server. The method also includes requesting from the second computer to the media server a playback request for the presentation stream and/or the presentation file. The method also includes delivering from the media server to the second computer the presentation stream and/or the presentation file based on the playback request. The method further includes retrieving on the second computer the media sample from the web component stream included in the presentation stream and/or the presentation file. Furthermore, the method includes rendering the media sample on the second computer.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
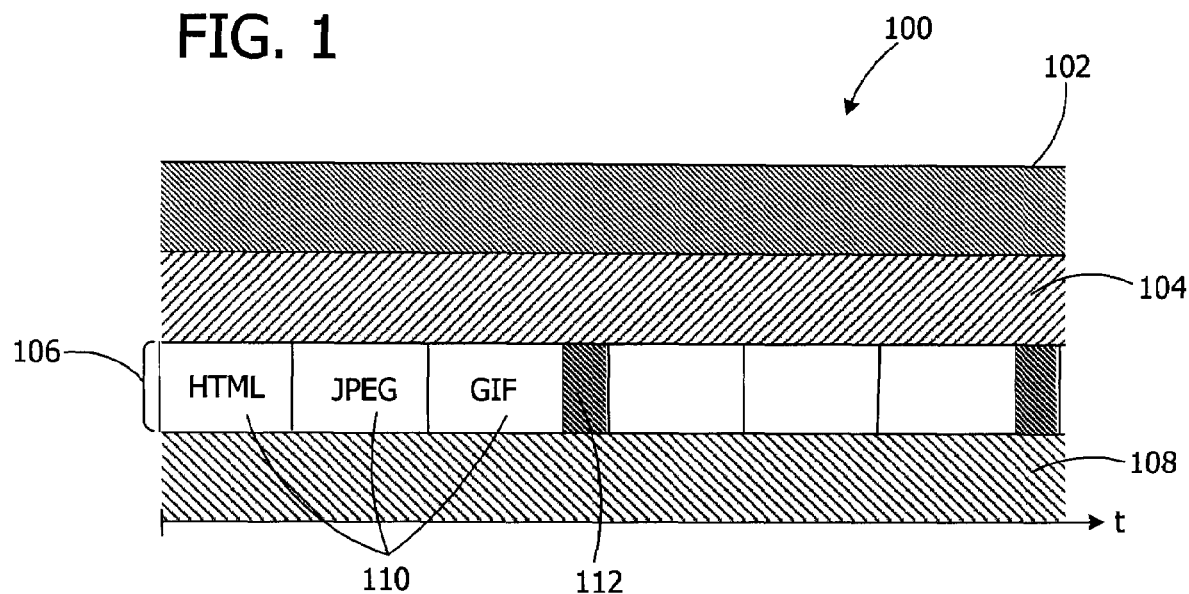
FIG. 1 is an exemplary timing diagram illustrating one embodiment of the structure of a presentation stream having a format according to the invention.

Referring now to the drawings, there is generally indicated at FIG. 1 an example of the structure and format of a presentation stream 100 according to the invention. In particular, FIG. 1 generally indicates a data signal being transmitted over a time t having one or more data fields comprising data encoded in a streaming media format. In this example, the data fields include an audio component stream 102, a video component stream 104, a web component stream 106, and a script component stream 108, although other streams or combinations of streams are also contemplated. Even though in this example, the presentation stream 100 is a collection of various component streams (e.g., the various component streams are multiplexed to form a single presentation stream), it is contemplated that the various component streams are not multiplexed into a presentation stream and are transmitted independently of each other via a plurality of communications channels. Also, it is contemplated that the various component streams may share a single managed bandwidth for delivery to a client machine without being multiplexed into a presentation stream. Furthermore, although in this example, the presentation stream 100 includes various component streams, it is contemplated that only a web component stream is included in the presentation stream 100 or that a web component stream comprises the sole data signal. As generally indicated at FIG. 1, the web component stream 106 further includes one or more media samples. The media samples each contains a type of data such as HTML, joint photographic experts group (JPEG), graphics interchange format (GIF), etc. In one embodiment of the invention, media samples that form a single rendering point of a presentation (e.g., a single web page and various attachments to the web page that are to be presented at the same rendering time) are sequentially transmitted in a time line as a group. For example, the HTML sample, the JPEG sample, and the GIF sample of the web component stream 106 together form a single rendering point of a presentation and are sequentially transmitted in a time line as a group of media samples 110. Generally, immediately following this group of related media samples 110 in a sequential time line is a rendering sample 112. The rendering sample 112 includes rendering commands for this group of media samples 110. The rendering commands include, among other things, a rendering time for each of the related media samples 110. In particular, the rendering commands include information indicating to a renderer when to render the media samples 110 so that the rendering commands coordinate synchronization between the media samples 110 and additional data other than web content data such as the audio component stream 102 and the video component stream 104. In another embodiment of the invention, if a single media sample forms a single rendering point (e.g., a plain web page with no attachments), a rendering sample is transmitted immediately after the single media sample in a sequential time line. Likewise, the rendering sample includes a rendering command for the single media sample.

Figure 2:
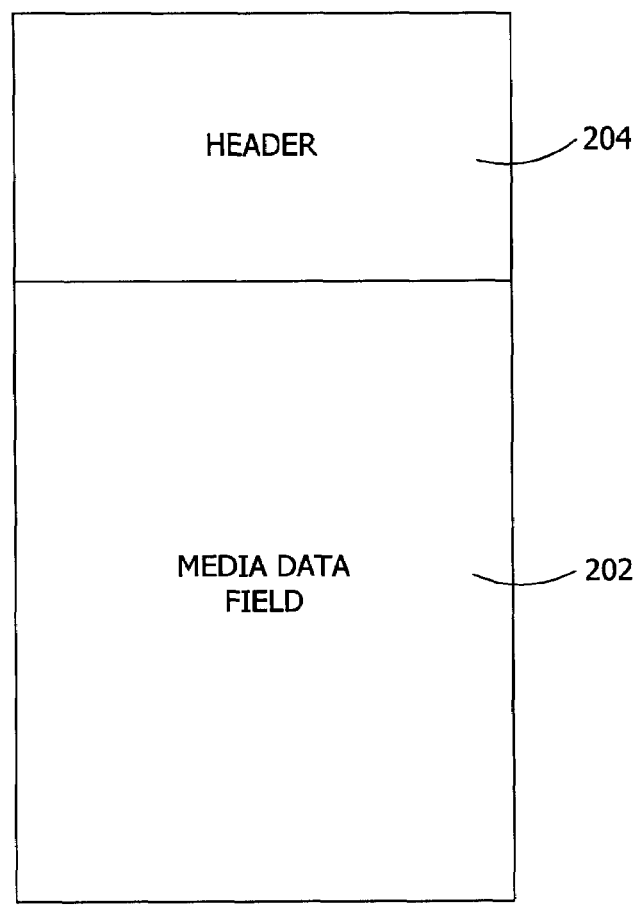
FIG. 2 is an exemplary block diagram illustrating one embodiment of the structure of a media sample according to the invention.
Figure 3:
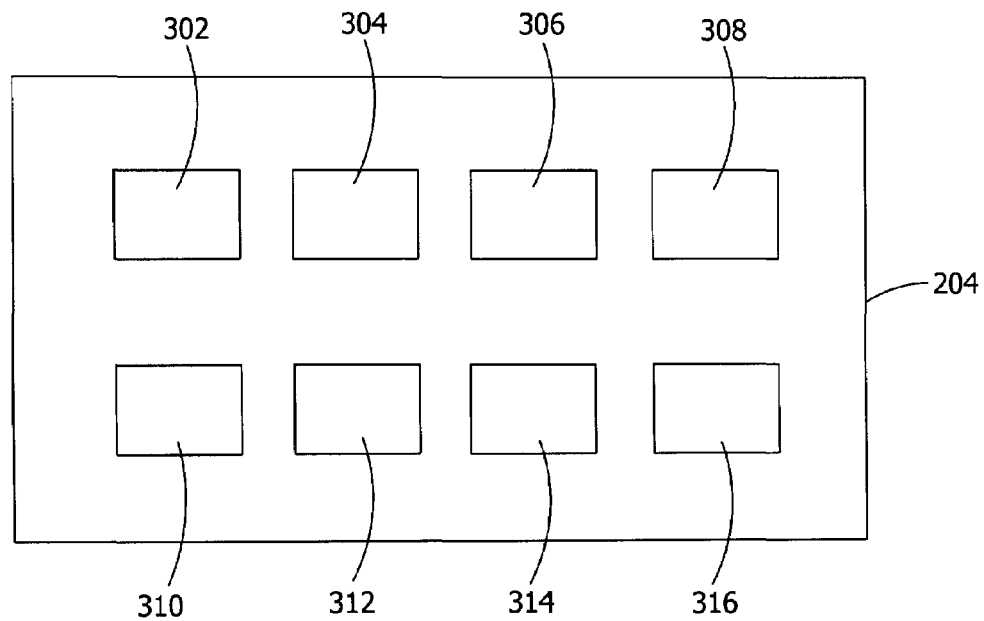
FIG. 3 is an exemplary block diagram further illustrating one embodiment of the structure of the header of the media sample of FIG. 2.

Referring to FIG. 2, the structure of each media sample 110 according to the invention is shown. Each media sample 110 comprises two fields, one field containing media data 202, and the other field containing a header 204 for the media sample 110. FIG. 3 generally indicates in more detail the structure of the header 204 of the media sample 110. As shown in FIG. 3, the header 204 includes tags indicating information regarding the media sample 110. The tags may indicate, among other things, a rendering time 302 for the media sample 110, a pre-roll time 304 for the media sample 110, a send time 306 for the media sample 110, a type 308 of the media sample 110, a name 310 of the media sample 110, a size 312 of the media sample 110, a compression type 314 of the media sample 110, and a uniform resource locator (URL) 316 for the media sample 110.

Figure 4:
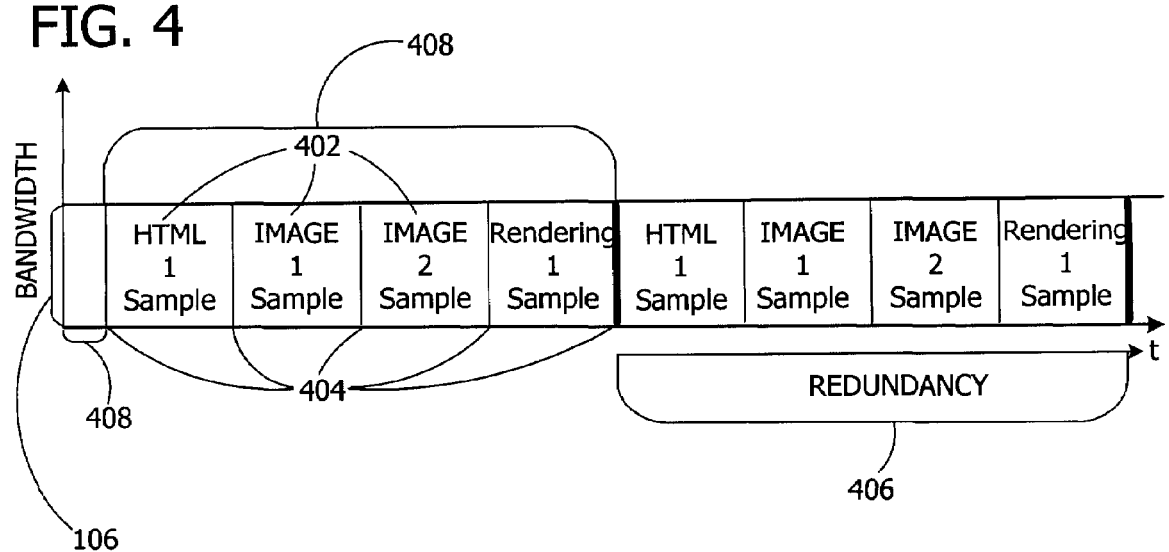
FIG. 4 is an exemplary timing diagram in block form illustrating one embodiment of the structure and operation of a web component stream according to the invention.

FIG. 4 generally indicates the structure and operation of the web component stream 106 over time. The invention defines a format for packaging web content data from multiple files into multiple logical web component streams with an overall bandwidth management object that manages the aggregate bandwidth of the web component streams. The format enables web content data to be synchronized for delivery and playback. The format also defines how the media samples are packetized into a web component stream. As shown in FIG. 4, the web component stream 106 includes one or more media samples 402 comprising one or more types of data. The media samples 402 are arranged in a timeline and can be distributed over multiple packets. Thus, the media samples 402 are streamed down over a computer-readable medium continuously. The web component stream 106 also includes one or more clean points 404 to represent key frames for the web content data that is contained in the web component stream 106. Clean points 404 allow a media server to respond to a seeking request (e.g., scanning a presentation or navigating data by skip, pause, fast forward, and fast rewind operations) for a particular media sample in the web component stream 106 more effectively than using other mechanisms. For example, whenever a client requests a particular media sample from the media server (e.g., if the client joins a presentation in mid-session or wants to skip, pause, fast forward, or fast rewind), the media server looks at the web component stream 106 and finds the clean point corresponding to the requested media sample. The media server streams every media sample that is encoded after that identified clean point to the client. Thus, clean points 404 allow the media server to seek a particular media sample in a manner similar to the manner in which a key frame of video data allows the media server to seek to a particular point in the video data. In another example, if a particular media sample gets lost in a lossy transport, the client may submit a seeking request to the media server, and the media server returns to the last clean point and re-delivers everything that is encoded after that clean point to the client. In this way, the client immediately receives the lost data and does not have to wait a long period of time for re-downloading or re-streaming a web component stream before the transmission and display of the web component stream is re-established. Even though there is generally one clean point per media sample, it is also contemplated that there is a single clean point per group of media samples. Thus, when the client requests a particular rendering point in the presentation, the media server may deliver to the client the correct group of media samples that together form this requested rendering point.

Another advantage of the web component stream format as shown in FIG. 4 is that separate web content data delivery and content trigger mechanisms allow media samples to be delivered ahead of time and then triggered for display. Because several separate media samples may all need to be triggered for display simultaneously, one cannot use end-of-content-delivery to trigger the display of that content. For example in FIG. 4, HTML 1 sample, IMAGE 1 sample, and IMAGE 2 sample all need to be triggered simultaneously. Thus, all of these media samples need to be completely delivered to a client machine before Rendering 1 sample may trigger the rendering or display of these media samples altogether. The invention also enables handling of multiple web component streams so that different components of a presentation can be delivered independently. For example, if two frames within a web page receive different components (e.g., slides, banners, or ticker information), each frame has a separate web component streaming track. There are several ways to implement delivery of multiple web component streams. In one embodiment of the invention, multiple web component streams may be delivered independently of each other via a plurality of communications channels. In another embodiment of the invention, multiple web component streams may be multiplexed and delivered as a presentation stream. In yet another embodiment of the invention, multiple web component streams may share a single managed bandwidth for delivery to a client machine without being multiplexed into a presentation stream.

FIG. 4 further generally illustrates the concept of redundant streaming as represented in a redundant web component stream 406, which is a duplicate of a previous web component stream 408 in that both web component streams 406 and 408 include HTML 1 sample, IMAGE 1 sample, IMAGE 2 sample, and Rendering 1 sample. Rendering 1 sample, which includes rendering commands for HTML 1 sample, IMAGE 1 sample and IMAGE 2 sample, is redundantly streamed so as to provide another trigger mechanism for HTML 1 sample, IMAGE 1 sample and IMAGE 2 sample of the redundant web component stream 406. Although in this example the redundant web component stream 406 appears immediately after the previously transmitted web component stream 408, it is contemplated that the redundant web component stream 406 may be transmitted at any later time after transmission of the previous web component stream 408. In addition, although in this example the redundant web component stream 406 has several duplicate media samples, it is contemplated that the redundant web component stream 406 has one or more duplicate media samples. Also, although in this example the redundant web component stream 406 is shown to be retransmitted once, it is contemplated that the redundant web component stream 406 may be retransmitted more than once.

For some network configurations, such as multicast, packets from a web component stream can be lost. Using one-way or sessionless protocols that have no back-channel can mean data loss without recovery. Thus, for the web component stream format of the invention, media samples are redundantly encoded in a web component stream so that during a time period, a particular media sample would appear at least twice in the web component stream. The invention defines a mechanism for redundantly writing data into a component stream so that if the data is lost or if a client joins a presentation in mid-session, the missed data is still delivered in a timely manner without any additional bandwidth requirement on the network. For example, if a client connects through a media server for a live broadcast and misses a media sample, the client may just wait for a redundant web component stream. In the case where the missed media sample is a redundant sample, it will be transmitted again to the client automatically at the next redundant transmission.

There is also generally illustrated at FIG. 4 a pre-roll time 408. The pre-roll time 408 indicates how long a content author has to get data to a client before it can start showing the client that data. For live presentations, a content author must calculate and set up a pre-roll time because once a media server starts presenting a web component stream to a client, the media server should be in a position to provide all media samples to the client in the future on time so that there is no interruption of the web component stream and the presentation is seamless. Thus, the pre-roll time 408 is a value that indicates that a live presentation can begin after a certain period of time so that the presentation will be without interruption for the rest of the way throughout the presentation. Another advantage of the pre-roll time 408 is that the client only waits once for the initial pre-roll time 408 but does not have to wait during the rest of the presentation. By waiting the pre-roll time 408, a media sample should always have been delivered to the client machine before the rendering time of the media sample. In general, pre-roll time ranges from 3 to 40 seconds depending upon the intention of a content author and is generally calculated as the maximum size of a media sample divided by the network bandwidth available for data streaming.

Figure 5:
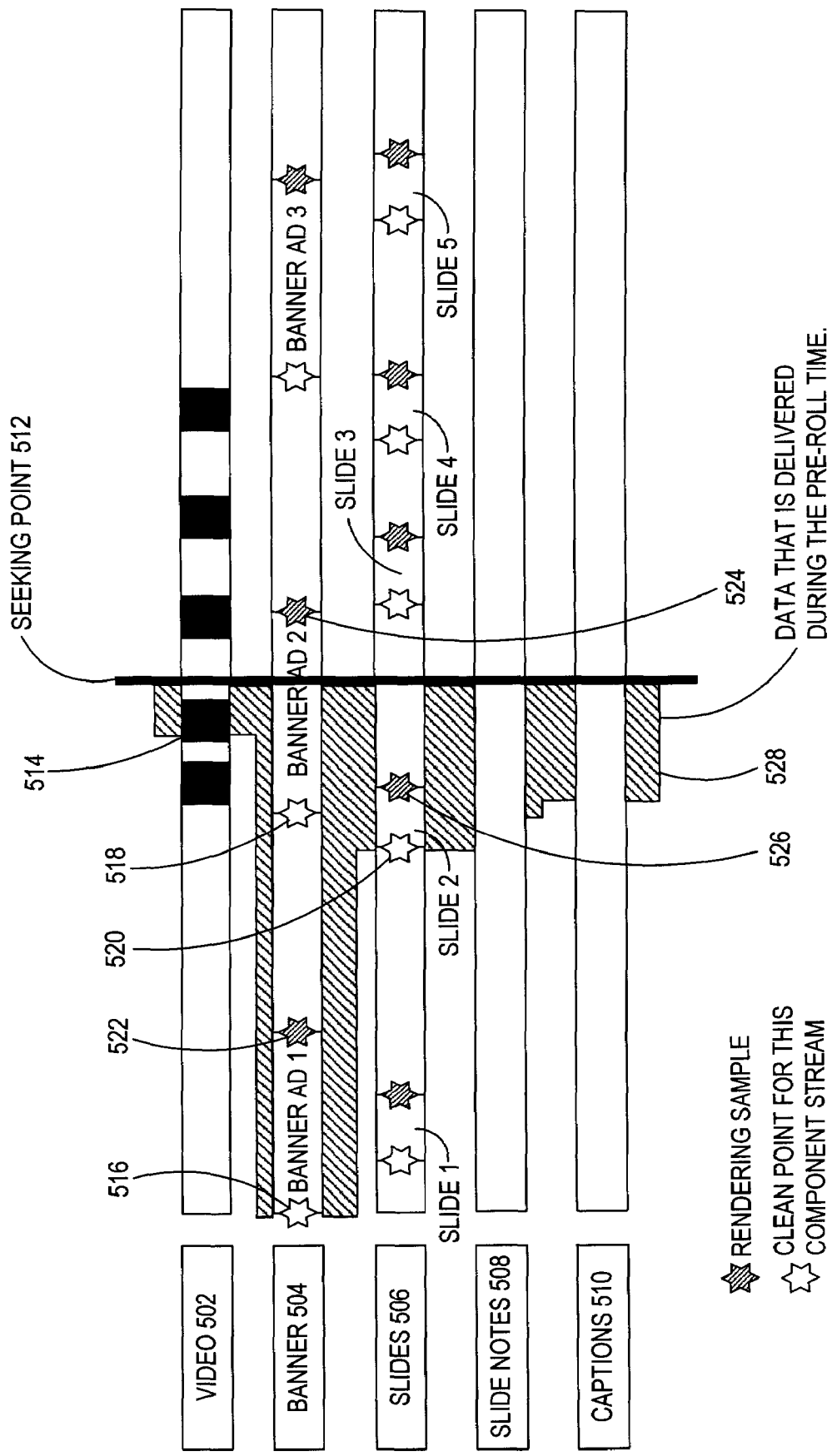
FIG. 5 is an exemplary timing diagram in block form illustrating one embodiment of the operation of a media server handling a seeking request from a client according to the invention.

FIG. 5 generally illustrates an example of the operation of a media server handling a seeking request from a client. Such operation is generally referred to as ragged clean points (i.e., component streams each has a different time distribution of clean points due to varying component or media sample size) handling. In addition, even though ragged clean points are handled by the media server in this example, it is contemplated that ragged clean points may be handled locally on a client machine (e.g., local or mobile playback) without the aid of the media server. FIG. 5 shows a video component stream 502, a banner component stream 504, a slides component stream 506, a slide notes component stream 508, and a captions component stream 510. (The banner component stream 504, slides component stream 506, slide notes component stream 508, and captions component stream 510 are generally referred to as web component streams.) These component streams are delivered from the media server to the client in a synchronous manner to form a complete presentation. As further illustrated in FIG. 5, the banner component stream 504 includes a BANNER AD 1 sample, a BANNER AD 2 sample, and a BANNER AD 3 sample. Also, the slides component stream 506 includes a SLIDE 1 sample, a SLIDE 2 sample, a SLIDE 3 sample, a SLIDE 4 sample, and a SLIDE 5 sample. In this example, immediately preceding each of these media samples in a time line is a clean point. Also in this example, immediately following each of these media samples in a time line is a rendering sample that includes a rendering command for the media sample. For example, immediately preceding BANNER AD 1 sample in the time line of the banner component stream 504 is a clean point 516. Immediately following BANNER AD 1 sample in the time line of the banner component stream 504 is a rendering sample 522. Generally, there is a different set of clean points for each component stream so that the media server may separately manage each component of the presentation.

As illustrated in FIG. 5, the client requests to the media server a seeking operation (e.g., pause, skip, fast forward, fast rewind) so that the whole presentation begins rendering at a seeking point 512. In response, the media server looks at each web component stream individually and finds the last clean point preceding the seeking point 512 in the time line for each of the web component streams. Similarly, the media server looks at the video component stream 502 and finds the last key frame preceding the seeking point 512 in the time line. Thus, the media server finds key frame 514 for the video component stream 502, clean point 518 of BANNER AD 2 sample for the banner component stream 504, and clean point 520 of SLIDE 2 sample for the slides component stream 506. However, the media server realizes that BANNER AD 2 sample of the banner component stream 504 may not be ready for rendering at the seeking point 512 because the rendering sample 524 of BANNER AD 2 sample is encoded after the seeking point 512 along the time line. Therefore, the media server looks further back to clean point 516 of BANNER AD 1 sample, as BANNER AD 1 sample is ready to be rendered at the seeking point 512. After the media server finds a corresponding clean point or key frame for each of the component streams of the complete presentation, the media server delivers to the client machine the media sample or video data that is encoded after the found clean point or key frame for each of the component streams. Thus, the media server delivers to the client machine video data that is encoded after key frame 514 in the video component frame 502. Furthermore, the media server delivers to the client machine BANNER AD samples encoded after clean point 516 in the banner component stream 504 and SLIDE samples encoded after clean point 520 in the slides component stream 506. After a pre-roll time (e.g., buffering time for data transmission), BANNER AD 1 sample of the banner component stream 504, SLIDE 2 sample of the slides component stream 506, and the video data encoded after key frame 514 in the video component stream 502 are all ready to be rendered at the client machine. Block 528 of FIG. 5 indicates data that is delivered from the media server to the client machine during this pre-roll time.

An advantage of ragged clean points handling is that all component streams within a presentation have independent clean points on them so that pre-roll (e.g., buffering) can happen from a prior clean point for each component of the presentation. In this way, a media server is able to deliver various components of the presentation to a client machine in a synchronous manner. Thus, a client does not encounter a bad seeking experience where while video and audio data is being rendered on the client machine, the slide or image to be presented simultaneously with the video and audio data is still not completely delivered and thus not ready to be rendered. Such a seeking experience may occur because it generally takes longer time to stream a slide or image than the time it takes to stream video or audio data.

Figure 6:
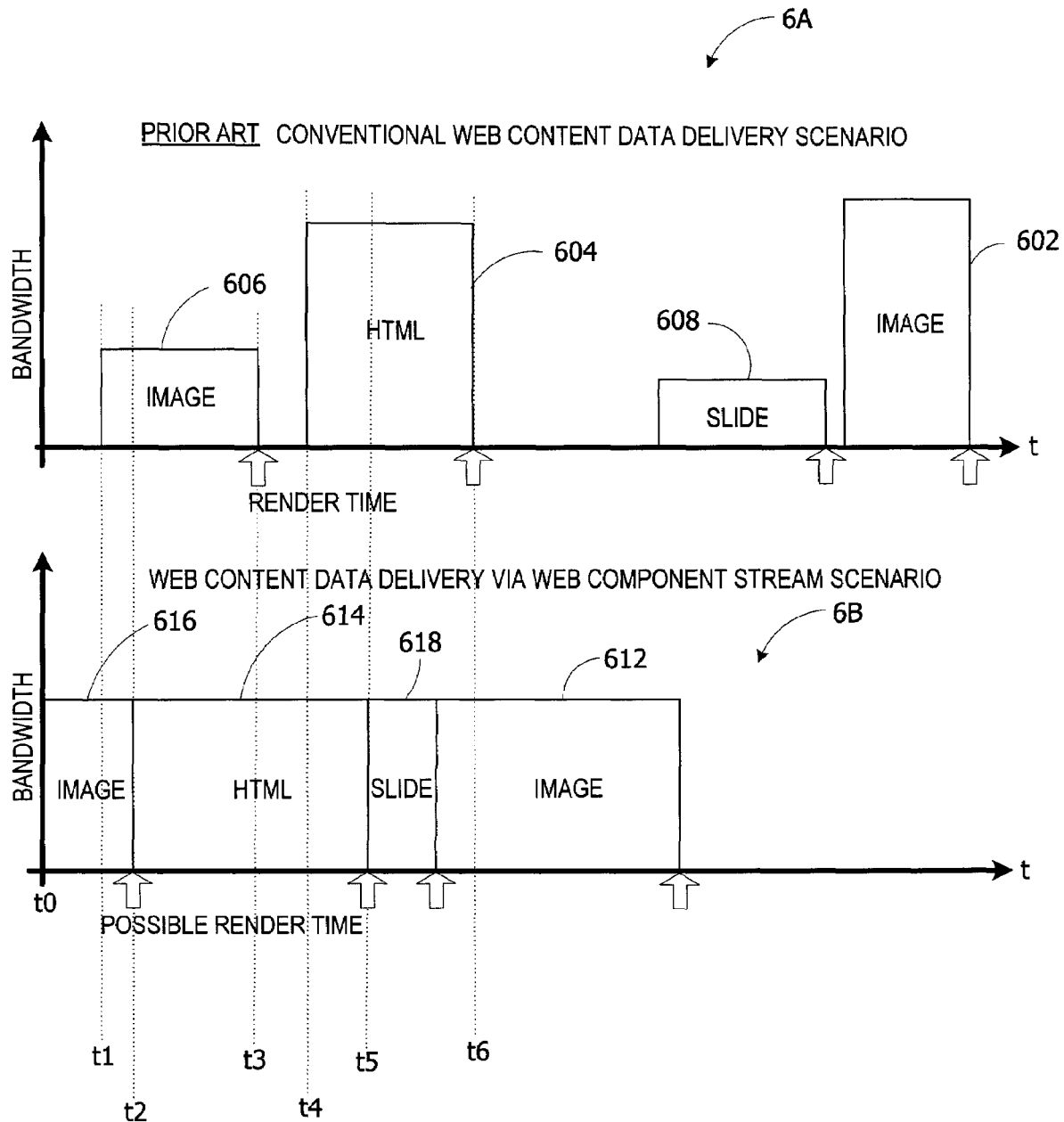
FIG. 6 is an exemplary timing diagram in block form illustrating the difference between a prior art web content data delivery scenario and the delivery of web content data via a web component stream scenario according to one embodiment of the invention.

Referring now to FIG. 6, there is generally shown an exemplary timing diagram in block form illustrating the difference between a prior art web content data delivery scenario and the delivery of web content data via a web component stream scenario according to one embodiment of the invention. In this illustration, time is indicated along the horizontal axis and bandwidth of each media sample being transmitted is indicated along the vertical axis. As indicated in graph 6A, in the conventional web content data delivery scenario, individual media samples are downloaded piece by piece with varying peak bandwidth that depends on the bandwidth utilization of the web server. Particularly, because the network bandwidth is shared among multiple clients, any sudden pulling or downloading requests from multiple clients may cause the web server to dedicate only a portion of the network bandwidth for each client, thus resulting in jerky bandwidth utilization over time. For example, graph 6A illustrates that IMAGE sample 602 is delivered to a client with the greatest bandwidth utilization followed by HTML sample 604, IMAGE sample 606, and SLIDE sample 608, which is delivered to the client with the least bandwidth utilization. In this example, SLIDE sample 608 is delivered to the client with the least bandwidth utilization because the web server may be responding to numerous pulling or downloading requests from other clients at the same time, and thus allocating a portion of the network bandwidth for those clients. In addition, because the web server may dedicate the full network bandwidth for sudden pulling or downloading requests from other clients, no idle network bandwidth may be available for a particular client. This results in time gaps between downloading of individual media samples, as exemplified by the time gap the occurred between the downloading of HTML 604 sample and the downloading of SLIDE 608 sample in graph 6A. Therefore, the conventional scenario of graph 6A may result in prolonged overall download time of a presentation and longer delay for presentation playback.

In contrast, in the web component stream scenario according to the invention as indicated in graph 6B, individual media samples are encoded in a web component stream format such that the media samples are streamed within a substantially constant aggregate bandwidth and are substantially contiguous to each other in a sequential time line. For example, IMAGE 616 sample, HTML 614 sample, SLIDE 618 sample, and IMAGE 612 sample in the web component stream scenario of graph 6B are streamed within a substantially constant aggregate bandwidth and are substantially contiguous to each other in a sequential time line. This format enables a content author to assign a substantially constant aggregate bandwidth to the web component stream so as to avoid uneven bandwidth utilization, and thus freeing up bandwidth on the network transmitting the media samples for more efficient bandwidth employment. In addition, by encoding media samples in a continuous web component stream of contiguous media samples, a client encounters better overall synchronization and less delay while media samples are retrieved for rendering, as there is essentially no time gap between streaming of individual media samples. Thus, the media samples, along with other data such as audio and video data that together form a complete presentation, are inside of a contained, smooth bandwidth utilization, which allows for networked delivery via a single media server and delivery via a computer storage medium having limited bandwidth capacity.

As also generally shown in FIG. 6, the web component stream scenario of the invention may result in a more accurate rendering time than that of the conventional scenario because the web component stream scenario reduces the possibility of uneven bandwidth utilization. For example, according to the invention, IMAGE sample 616 of the web component stream scenario begins streaming at t0 and is in the client machine ready to be triggered for rendering at t2 or thereafter, which times are respectively earlier than the times at which the corresponding conventional IMAGE sample 606 begins downloading at t1 and can be rendered at t3. Also, HTML sample 614 of the web component stream scenario begins streaming at t2 and is in the client machine ready to be triggered for rendering at t5 or thereafter, which times are respectively earlier than the times at which the corresponding conventional HTML sample 604 begins downloading at t4 and can be rendered at t6. Thus, by using the web component stream scenario of graph 6B of the invention, the media samples are streamed and stored in the client machine ready to be triggered for rendering at appropriate rendering times. In contrast, in the conventional scenario of graph 6A, the web server may not be able to completely deliver the media samples to the client machine on time for rendering due to the possibility of web server overload.

These advantages result in a more efficient use of the bandwidth on a network. For example, if there are a large number of clients receiving the same presentation, there will be a smooth network utilization because all clients essentially use a constant, reduced aggregate bandwidth as shown by graph 6B of the network transmitting the presentation. In the conventional transmissions as shown by graph 6A, every time a slide or page flips, there are a large number of clients trying to get that slide or page, which may cause lost data as a result of server overload. In addition, the web component stream scenario of the invention enables the possibility of multicast, which means that one can stream the web content data from a media server over a multicast to multiple clients with only one copy of that data on the network. By enabling multicast, the invention further reduces the possibility of server overload and multiple pulling requests from multiple clients because there is only one network utilization rather than a dedicated connection for each client.

Figure 7A:
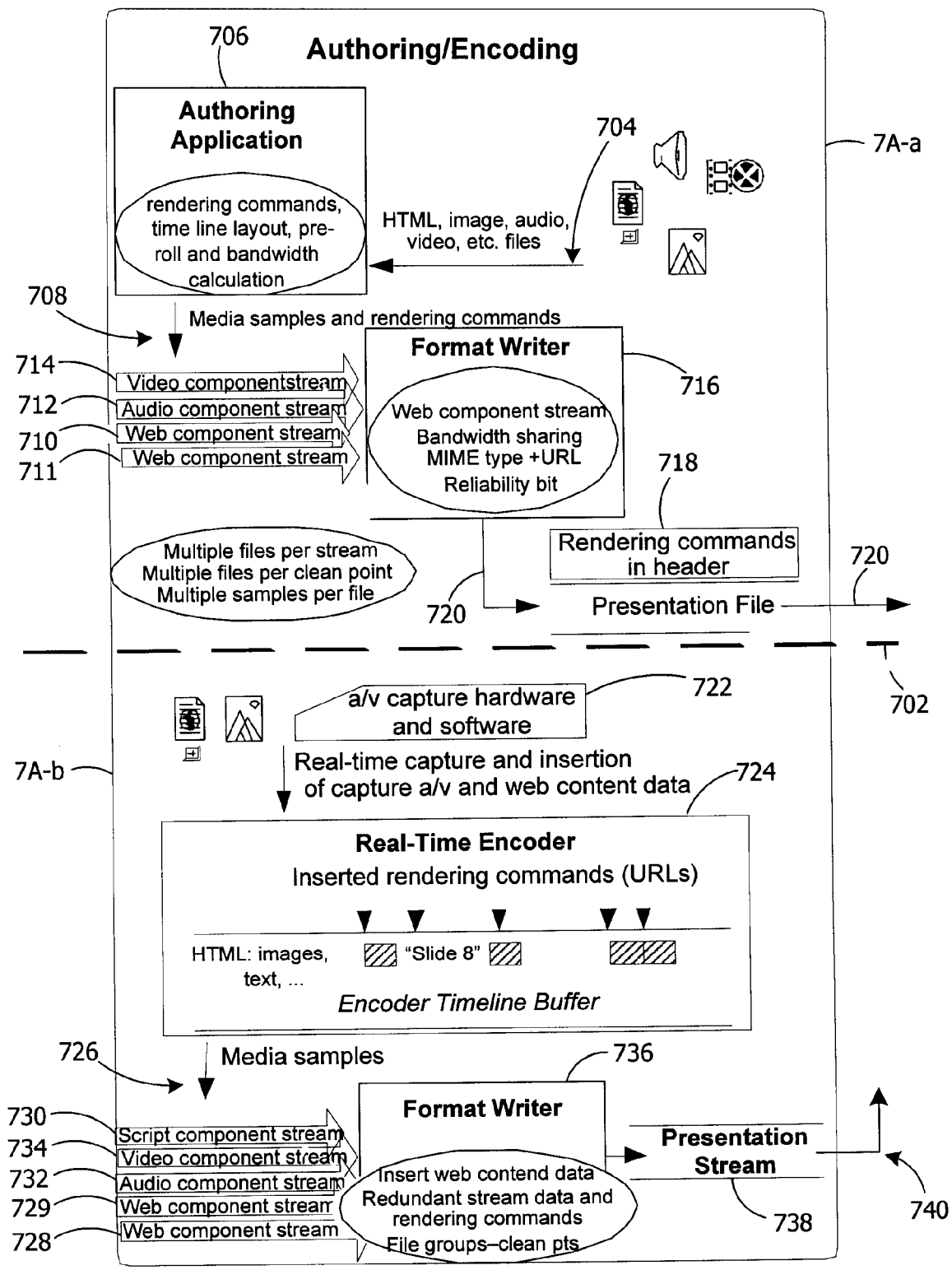
FIG. 7A is an exemplary diagram illustrating one embodiment of the method of the invention for authoring and encoding a web component stream.

FIG. 7A generally illustrates an example of the method of the invention for authoring and encoding a web component stream. In general, the invention for authoring and encoding a web component stream may be divided into an "offline" scenario and a "real time" scenario as separated by line 702 in FIG. 7A. In one example of the "offline" scenario as generally illustrated by block 7A-a, a content author obtains or creates web content data and/or media data such as media samples (e.g., HTML, image), audio and/or video, as represented by arrow 704. The content author decides when to render the media samples, audio, and/or video on a client machine by setting a rendering time for each of these media samples, audio, and/or video. In addition, the content author sets a pre-roll time for each of these media samples, audio, and/or video. As described above, the pre-roll time indicates how long a content author has to get data to a client before the client can start rendering that data. In an authoring application 706, a send time for the audio, video, and/or each piece of the media samples is calculated and set. The send time generally refers to the time that a media server should begin delivering the media sample, audio, and/or video via a network to a client in order for the client to receive them on time for rendering. The authoring application 706 generally calculates the send time for the media sample, audio, and/or video by subtracting the rendering time of the media sample, audio, and/or video by the corresponding pre-roll time. For example, if the rendering time of a particular media sample is at t10 and it takes 5 time units to pre-roll the media sample, then the send time for that media sample is set at t5 or earlier. Thus, the send time precedes the rendering time, and both are generally independent of each other. In one embodiment of the invention, the authoring application 706 may also assign a URL to each media sample for future reference by a client. The authoring application 706 may further issue rendering commands for the media samples. The rendering commands generally indicate to a renderer on a client machine when and how to render the media samples. The rendering commands may also coordinate synchronization between the media samples and other data such as audio and video data. The authoring application 706 also sets a time line layout for a plurality of media samples. The time line layout represents the order of the media samples to be rendered on a client machine. The authoring application 706 may calculate and set a substantially constant aggregate bandwidth for the media samples for smooth and continuous delivery over a network.

As generally represented by arrow 708 in block 7A-a, the authoring application 706 encodes the media samples into a web component stream 710 and a web component stream 711. In addition, rendering commands are packaged within rendering samples, which are further encoded in the web component streams 710 and 711. A rendering sample is encoded following a group of related media samples that form a single rendering point. In this way, the rendering sample can trigger a renderer to render this group of related media samples simultaneously and in a synchronous manner. As also generally shown in block 7A-a, the authoring application 706 may encode data other than web content data into separate component streams such as an audio component stream 712 and/or a video component stream 714. In one embodiment of the invention, the authoring application 706 may author the web content data in multiple languages and encode the authored web content data (e.g., media samples) in multiple web component streams with each web component stream corresponding to one of the multiple languages. In yet another embodiment of the invention, the authoring application 706 may also encode the web content data in a plurality of web component streams with each web component stream having an assigned bandwidth. In yet another embodiment of the invention, the authoring application 706 may encode the web content data in a plurality of web component streams with each web component stream corresponding to an assigned data quality level. In these embodiments, each web component stream can be generally defined as being exclusive or independent from other web component streams in a presentation stream or presentation file based on the language, bandwidth, or quality level setting of the web component stream. The web component streams having the appropriate language, bandwidth, or quality level may then be automatically selected by a renderer on a client machine when the renderer requests the presentation stream or presentation file from a media server. By authoring web component streams having different languages, bandwidths, or quality levels in a presentation stream or presentation file for multiple target clients, the invention enables scalability. Using the above-described mechanism, the authoring application 706 may also enable scalability for other data such as audio and/or video data.

As generally illustrated in block 7A-a, the authoring application 706 delivers the web component streams 710 and 711, along with any other component streams that are to be included in the same presentation (e.g., audio component stream 712 and/or video component stream 714), to a format writer 716. In one embodiment of the invention, the format writer 716 may be a software component that writes the format of a web component stream and groups various component streams into a presentation stream or presentation file. The format writer 716 may also perform other miscellaneous functions. In one embodiment of the invention, the format writer 716 may include clean points in the web component streams 710 and 711 to represent key frames for the web content data. As discussed above, these clean points allow a media server to respond to seeking of a particular media sample by a client. In another embodiment of the invention, the format writer 716 may enable bandwidth sharing by allocating bandwidth to multiple component streams of varying bandwidth. The format writer 716 may also arrange a plurality of media samples in a web component stream in a synchronized manner so that each media sample is rendered on a client machine at an appropriate time. Furthermore, the format writer 716 may create a header in the presentation file and store the rendering commands for the media samples in the header, as represented by box 718. As represented by arrow 720, the format writer 716 delivers the presentation file to a media server via a communications channel or via a computer storage medium such as compact disk read-only memory (CD-ROM). The presentation file may also be stored in a computer-readable medium for future revision or other use.

One important aspect of the functionality of the format writer 716 not illustrated in FIG. 7A is that the format writer 716 may apply digital rights management (DRM) encryption to the content of the presentation file. In general, DRM is the act of encrypting a presentation file and then distributing that presentation file to a market (e.g., over the Internet). The encrypted presentation file may be decrypted and viewable to anyone who owns the right to view the presentation file or is otherwise authorized to view the presentation file. Thus, a client may not view video, hear audio, or render a media sample included in an encrypted presentation file unless the client owns the right or is otherwise authorized to playback the entire encrypted presentation file. Moreover, the right to programmatically access the encrypted presentation file is generally restricted to authorized persons. For example, an individual may have the right to render a media sample in a presentation file but may not copy or print that media sample unless the individual also has the right to copy or print it out. Thus, an unauthorized person may not copy the encrypted presentation file for reselling or redistribution. One may apply DRM in a corporate environment where a content author may desire to limit the audience of a presentation. Furthermore, a content author may license an encrypted presentation file on a computer-readable medium without the risk that a licensee may make multiple copies of the presentation file and distribute them improperly.

Turning to an example of the "real time" scenario as generally illustrated by block 7A-b, a content author captures web content data and/or media data using one or more multimedia devices as represented by box 722. For example, the multimedia device may be a digital camera, a digital recorder, an application program that creates slides presentation, or any other software or hardware device that allows the content author to generate or create web content data and/or media data. The content author also sets a rendering time and a pre-roll time for each piece of the web content data and/or media data. A real time encoder 724 encodes each piece of the web content data into a media sample in real time. As further indicated by arrow 726, the media sample is encoded into a web component stream 728 and/or a web component stream 729. Media data such as audio and/or video data are encoded into an audio component stream 732 and/or a video component stream 734. Similar to the authoring application 706 of the "offline" scenario illustrated by block 7A-a, the real time encoder 724 may also issue a rendering command; calculate and set a send time; calculate a substantially constant bandwidth; assign a URL; and arrange a time line layout for the media sample. In another embodiment of the invention, the content author may provide scalability for the web content data and/or media data using the mechanism described above.

The web component streams 728 and 729, which may be accompanied by the audio component stream 732, the video component stream 734, a script component stream 730, and any other component streams, is delivered to a format writer 736, which corresponds to the format writer 716 of the "offline" scenario illustrated by block 7A-a. In the format writer 736, redundant web content data may be written to the web component streams 728 and 729 so as to accommodate delivery over lossy transports. For example, the format writer 736 may continuously write a particular media sample to the web component streams 728 or 729 so that during a period of time, that media sample would appear at least twice in the web component streams 728 or 729. In addition, the format writer 736 may also include clean points in the web component streams 728 and 729 to represent key frames for the web content data. The format writer 736 combines the various component streams into a presentation stream 738. As indicated by arrow 740, the presentation stream 738 is streamed to a media server. In this example, the various component streams are multiplexed into the presentation stream 738. However, it is contemplated that the various component streams are streamed independently of each other to a media server and/or to a client machine via a plurality of communication channels. It is also contemplated that the various component streams may share a single managed bandwidth for delivery to a media server and/or to a client machine without being multiplexed into a presentation stream. It should be noted that no matter which delivery mechanism is employed, these component streams form a "logical" stream in a sense that they together form a complete and synchronous presentation.

In one embodiment of the "real time" scenario of the invention, the format writer 736 may apply DRM to the presentation stream 738 in a manner similar to which the format writer 716 of the "offline" scenario of block 7A-a applies DRM to the presentation file. In another embodiment of the "real time" scenario, the content author may broadcast or stream the presentation stream 738 live and simultaneously record it on a computer-readable medium. Thus, the content author would have a complete reproduction available immediately after the live presentation. The content author may deliver the reproduction to a media server on-demand to those who had missed the live presentation. In yet another embodiment of the "real time" scenario, a media sample having a large file size may be broken up into pieces. A media sample that has been broken up into pieces is called a multi-part sample. Furthermore, each piece of a multi-part sample may include a header with a tag indicating that it is a part of the multi-part sample. By breaking up a large media sample into pieces, the invention enables optimization of memory utilization because the media sample is read into the format reader 736 and delivered to a client via a media server piece by piece. For example, during a presentation, if a client decides to skip rendering a particular multi-part sample, a media server may simply immediately begin delivering the next media sample in a time line without the need to finish downloading the full data size of the skipped multi-part sample.

Figure 7B:
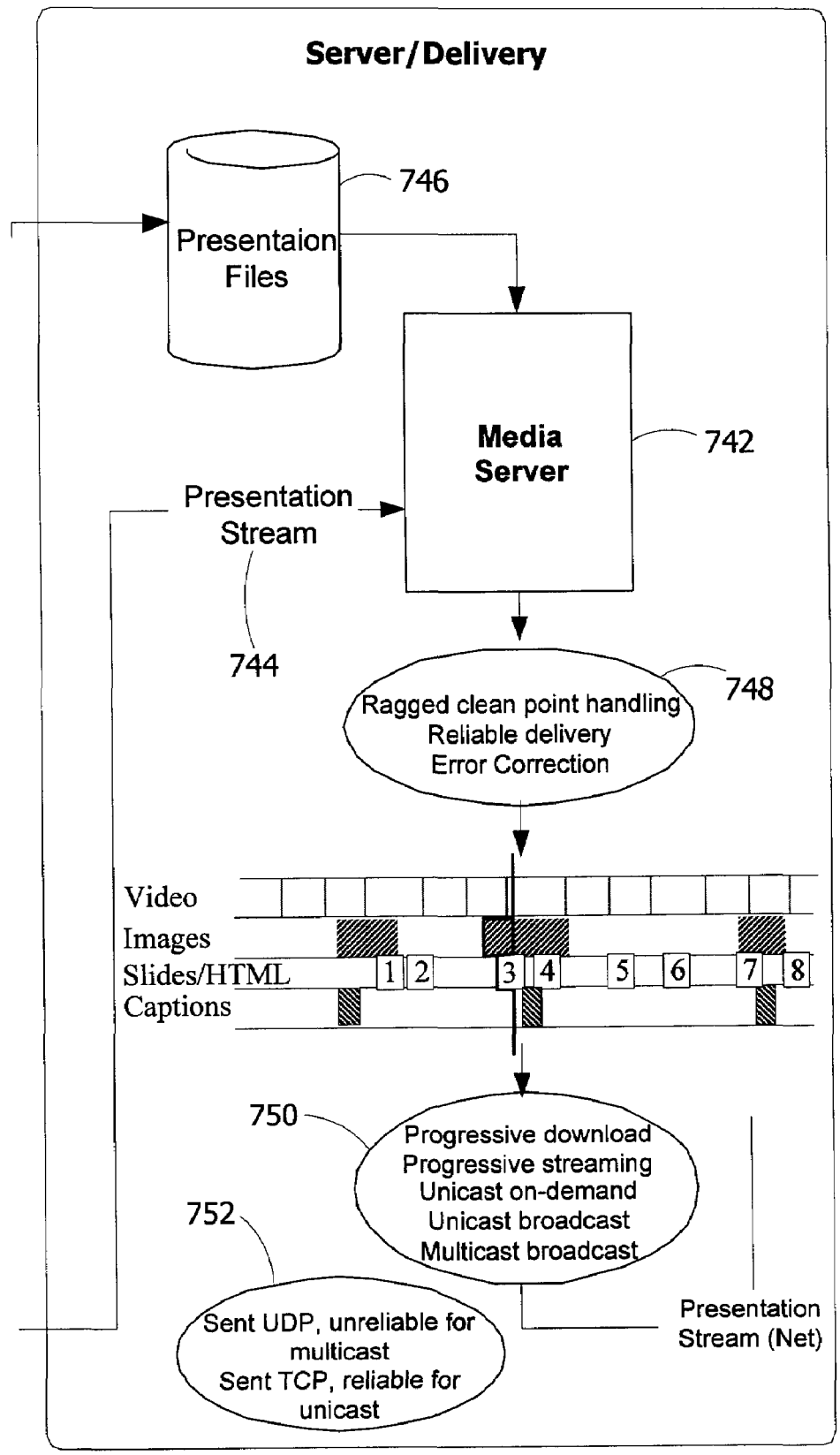
FIG. 7B is an exemplary diagram illustrating one embodiment of the operation of a media server serving a web component stream according to the invention.

Referring next to FIG. 7B, there is generally illustrated an example of the operation of a media server 742 serving a web component stream according to the invention. Generally, the media server 742 receives a presentation stream 744 from a content author. In another embodiment of the invention, the media server 742 may receive a presentation file 746 from a content author. After receiving the presentation stream 744 or the presentation file 746 from a content author, the media server 742 may receive a playback request from a client for the presentation stream 744 or presentation file 746. It is also contemplated that the media server 742 may receive the playback request for the presentation stream 744 or presentation file 746 prior to receiving the presentation stream 744 or presentation file 746. In one embodiment of the invention, the client may also request a language for the web content data, and the media server 742 may deliver to the client the web component stream having the requested language in the presentation stream 744 or presentation file 746. For example, the media server 742 may exclude those component streams that do not have the requested language from the presentation stream 744 or presentation file 746 so that the media server 742 provides to the client a component stream having the requested language. Similarly, the client may also request a bandwidth or a quality level for the web content data, and the media server 742 may deliver a component stream having the requested bandwidth or the requested quality level in the presentation stream 744 or presentation file 746. In addition, as indicated by block 748, the media server 742 may also handle a seeking request from a client. As generally described above and illustrated in FIG. 5, the media server 742 responds to a seeking request from a client by handling ragged clean points among various web component streams in the presentation stream 744 or presentation file 746.

In yet another embodiment of the invention, the media server 742 may provide DRM to the presentation stream 744 or presentation file 746 in a manner similar to that of the format writer 716 or 736 of FIG. 7A. Furthermore, the media server 742 may provide content management to the presentation stream 744 or presentation file 746. For example, the media server 742 may archive the presentation stream 744 or presentation file 746, or maintain individual component streams in a single archives Thus, the media server 742 may provide efficient media content management for future delivery to a client.

After receiving the playback request from the client, the media server 742 delivers the presentation stream 744 or presentation file 746 to the client. It is also contemplated that the media server 742 may deliver the presentation stream 744 or presentation file 746 to the client before or without receiving the playback request from the client. The media server 742 has a range of delivery options, as represented by blocks 750 and 752. In particular, the delivery options of the media server 742 may include, but are not limited to, progressive download, progressive streaming, unicast on-demand, unicast broadcast, or multicast broadcast. For example, the media server 742 may enable unicast broadcast by dedicating a single connection for each client via transmission control protocol (TCP). In another example, the media server 742 may enable multicast broadcast by allowing multiple clients to connect with the media server 742 via user datagram protocol (UDP). Since UDP does not provide for reliable and secure data delivery, web content data may be lost while being delivered to the clients. However, by streaming the web content data redundantly as noted above and illustrated by FIG. 4, each of the clients receives the lost web content data automatically in a short period of time. In one embodiment of the invention, the media server 742 may also provide accelerated streaming, which may result in less delivery time to the client. For example, the media server 742 may continuously stream web content data to the client if the media server 742 detects that there is enough idle bandwidth available in the network connection. In yet another embodiment of the invention, the media server 742 may handle data resend, error correction, logging, and all other standard streaming media server functions.

Figure 7C:
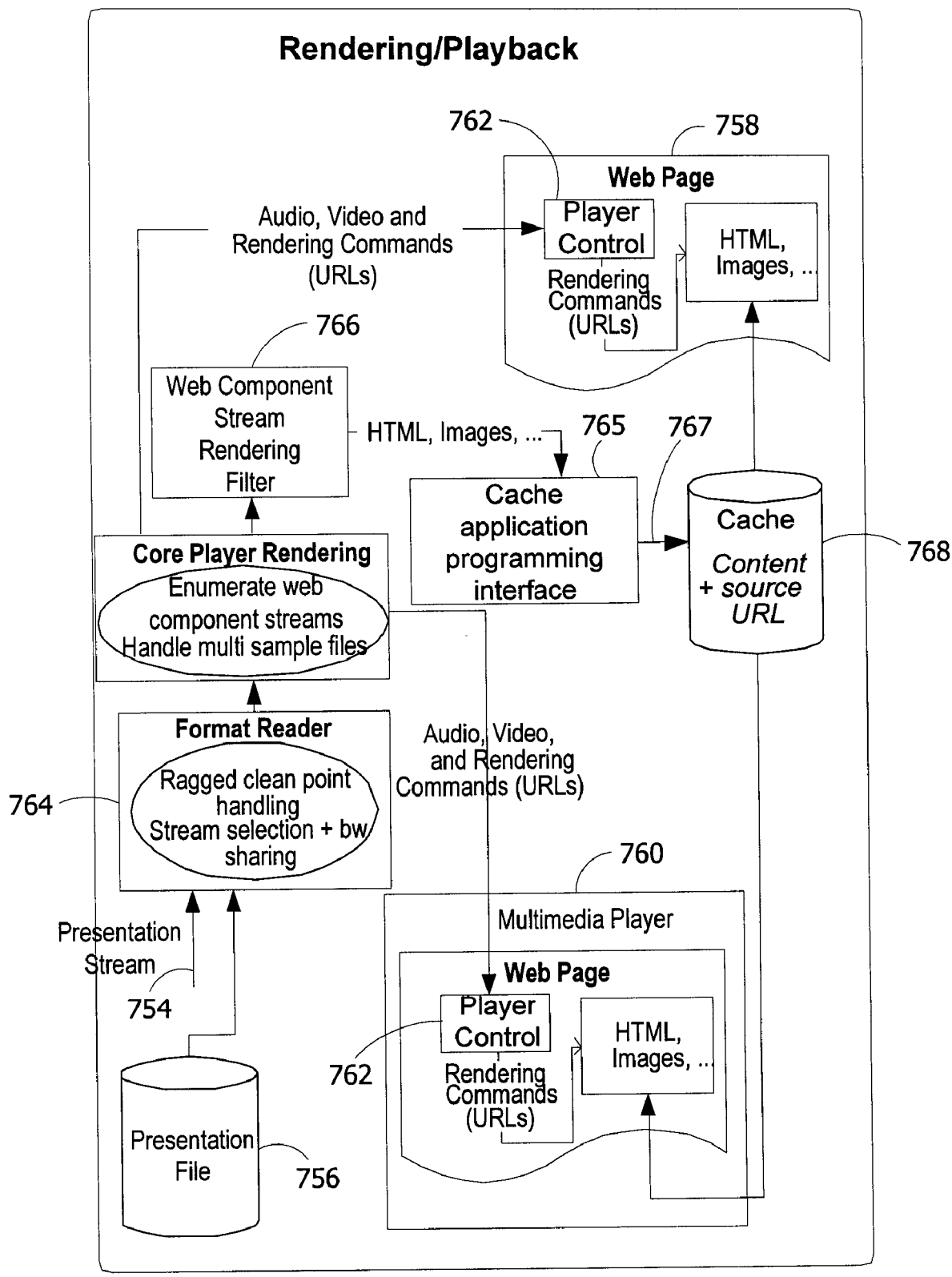
FIG. 7C is an exemplary diagram illustrating one embodiment of the operation of a client machine rendering a web component stream according to the invention.

FIG. 7C generally illustrates an example of the operation of a client machine rendering a web component stream according to the invention. Generally, a client receives a presentation stream 754 from a media server. Furthermore, the client may receive a presentation file 756 from the media server or from a web server. In one embodiment of the invention, the client may receive the presentation file 756 directly from a local computer-readable medium such as local hard disk or CD-ROM for local or mobile playback. For example, the locally received presentation file 756 may have been earlier delivered to the client via a media server or via CD-ROM distribution.

As generally illustrated by FIG. 7C, the presentation stream 754 or presentation file 756 is delivered to a format reader 764. In one embodiment of the invention, the format reader 716 may be a software component that is capable of reading the format of a presentation stream and web component stream. The format reader 764 extracts a web component stream from the presentation stream 754 or from the presentation file 756 and delivers the extracted web component stream to a web component stream rendering filter 766. In addition, the format reader 764 may also extract another component stream comprising data other than web content data (e.g., audio component stream and/or video component stream) from the presentation stream 754 or presentation file 756 and deliver the extracted component stream directly to a renderer. Such a renderer may be embedded in a browser 758 or in a multimedia player 760. Furthermore, there is generally a different renderer for each type of component stream. For example, an audio component stream is delivered to an audio renderer such as an audio player application, and a video component stream is delivered to a video renderer such as a video player application, whereas both the audio renderer and the video renderer may be embedded in the browser 758 or in the multimedia player 760 of the client machine. Generally, a client side player control 762 controls the rendering time of the audio component stream and/or the video component stream and coordinates synchronization with web content data. However, it is contemplated that the presentation stream 754 or the presentation file 756 may only include web content data (e.g., without audio and video data).

As further generally illustrated by FIG. 7C, the web component stream rendering filter 766 handles retrieving a media sample from the extracted web component stream. In particular, the web component stream rendering filter 766 retrieves a media sample by extracting individual packets from the extracted web component stream and re-constructing the media sample. As represented by arrow 767, the retrieved media sample is written into a cache 768 in a timely manner (e.g., via cache application programming interface 765). For a media sample that has been encrypted using DRM, it is decrypted and written into the cache 768 if the client is authorized to render the media sample. In addition, for a multi-part sample, the web component stream rendering filter 766 may first create an entry in the cache 768 and then re-construct and write the multi-part sample to the cache entry piece by piece as the web component stream rendering filter 766 receives parts of the multi-part sample. Furthermore, for delivery via unicast, if the multi-part sample is not completely delivered, the format reader 764 and/or the communications channel through which the presentation stream 754 or presentation file 756 is delivered may notify the media server to resend the missing pieces. Generally, the multi-part samples that are retrieved from the same presentation stream or from the same presentation file are stored in the cache 768 within a single file. For security issues, this prevents multi-part samples not stored within the same file in the cache 768 from being associated with other multi-part samples from another file.

After the media sample has been stored in the cache 768, a renderer such as the browser 758 or the multimedia player 760 may render the media sample at an appropriate time. In this example, the retrieved media sample is written and stored in the cache 768 before rendering. It is also contemplated that the retrieved media sample may not be written into the cache 768 and, instead, may be delivered directly to the renderer for rendering. In general, a rendering sample that is encoded in the web component stream along with the media sample includes a rendering command, which includes a rendering time for the media sample and triggers the renderer to begin rendering the media sample. In another embodiment of the invention, the rendering command may be included in the header of the presentation file 756. The player control 762 issues the rendering command by sending a request to the renderer to retrieve the specified media sample out of the cache 768. For example, the rendering command triggers the browser 758 to display an HTML page, and the HTML page in turn requests a particular media sample that has already been stored in the cache 768 to be rendered. In one embodiment of the invention, in retrieving the individual media samples from the cache 768, the renderer such as the browser 758 or the multimedia player 760 references a particular media sample by appending a custom protocol to a URL of the media sample. The custom protocol may enable the renderer to search for the media sample only in the cache 768. Another advantage of the custom protocol is that it may create a security zone for the downloaded or streamed web content data. In particular, every time a client renders a presentation stream or a presentation file, a different security zone is created. In other words, for every rendering session of a presentation stream or a presentation file, there is a unique security zone so that different rendering sessions of presentation stream or presentation file cannot communicate with each other. For example, by using a custom protocol to create a security zone as opposed to using the hypertext transfer protocol (HTTP) to access a media sample, a client is prevented from accessing a restricted media sample by specifying a domain name as part of a web component stream. Thus, media samples of a current rendering session of presentation stream or presentation file may not communicate with or access to media samples of a previous rendering session of presentation stream or presentation file. In addition, different frames in a web page may not programmatically access or communicate with data from another frame unless the frames are retrieved from the same security zone. In practical applications, this security aspect of the invention may prevent one frame from accessing or communicating with private corporation information that may be included in another frame within the same web page.

As described above, after the media sample is stored in the cache 768, it is invoked into the renderer (e.g., on a web page) and synchronized with all other data being rendered by the player control 762. The rendering command that is included in the rendering sample encoded in the web component stream indicates to the browser 758 or multimedia player 760 when and how to render the individual media sample. One may enable this aspect of the invention without any modification to the standard browser functionality for cache stuffing or file rendering. If the renderer renders the media sample successfully and if a subsequent redundant media sample is delivered to the client, the format reader 764 and/or the web component stream rendering filter 766 knows that the renderer has already rendered this media sample and ignores the redundantly delivered media sample. In addition, the player control 762, in conjunction with the web component stream rendering filter 766, may handle all the seeking and playback requests from scripts in the renderer or from the client.

At the renderer such as the browser 758 or the multimedia player 760, the rendering commands for the media samples coordinate synchronization between the media samples and additional data other than web content data (e.g., audio or video data). Therefore, by delivering web content data and other data in a presentation stream or in a presentation file, they will be rendered as part of a synchronized presentation. In one embodiment of the invention, the client may also store a presentation stream or a presentation file in a computer-readable medium such as local hard disk or CD-ROM for local or mobile playback.

Figure 8:
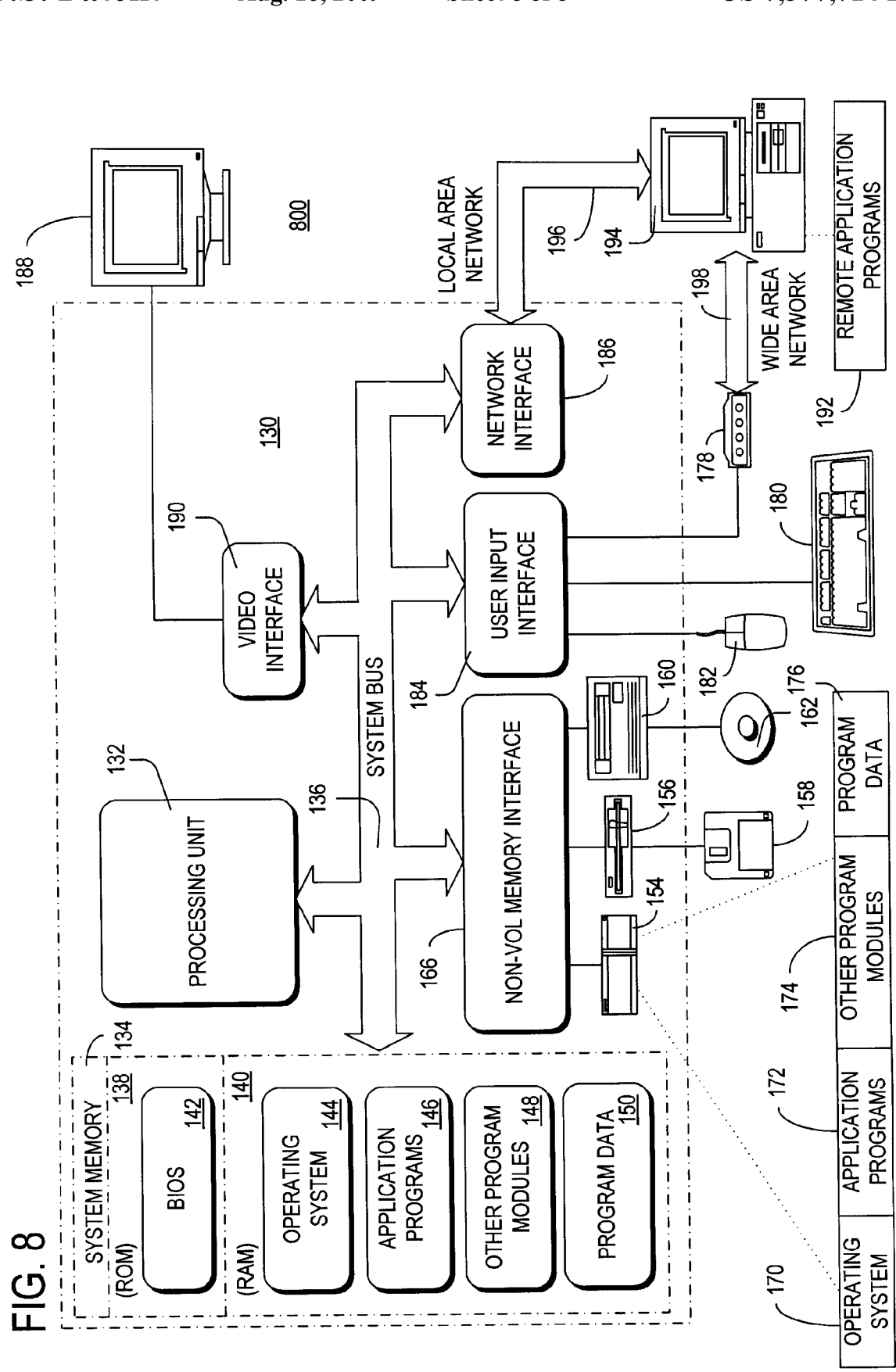
FIG. 8 is a block diagram illustrating one embodiment of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a LAN 196 and a WAN 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178, a digital subscriber line (DSL) (not shown) or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, a content author uses an authoring application 706 that resides in a computer such as computer 130 to execute computer-executable instructions to create or capture web content data and format the web content data into a media sample 110, which includes a header 204 with tags indicating information relating to the media sample 110. The authoring application 706 executes instructions to encode the media sample 110 into a web component stream 106. The authoring application 706 also executes instructions to encode a rendering sample 112, which comprises a rendering command for the media sample 110, in the web component stream 106. The authoring application 706 further executes instructions to encode audio and video data into an audio component stream 102 and a video component stream 104. The authoring application 706 further executes instructions to deliver the web component stream 106, along with the audio component stream 102, and the video component stream 104, and a script component stream 108, to a format writer 716 or 736. The format writer 716 or 736 executes instructions to combine these component streams into a presentation stream 100 or group these component streams into a presentation file. The content author then uses the computer 130 to execute instructions to deliver the presentation stream 100 or the presentation file to a media server via a magnetic disk 158, an optical disk 162, a LAN 196, or a WAN 198.

In operation, a server computer such as computer 130 or media server 742 executes computer-executable instructions to receive a presentation stream 744 or a presentation file 746 from a content author. The server computer may execute instructions to archive the presentation stream 744 or the presentation file 746 in the hard disk drive 154 for future playback requests. The server computer further executes instructions to receive a playback or seeking request from a client. The server computer further executes instructions to deliver the presentation stream 744 or the presentation file 746 to the client via a magnetic disk 158, an optical disk 162, a LAN 196, or a WAN 198.

In operation, a client uses a computer such as computer 130 to execute computer-executable instructions to receive a presentation stream 754 or a presentation file 756. The computer 130 executes instructions to deliver the presentation stream 754 or the presentation file 756 to a format reader 764. The format reader 764 executes instructions to retrieve a web component stream 106 out of the presentation stream 754 or presentation file 756. The format reader 764 further executes instructions to deliver the retrieved web component stream 106 to a web component stream rendering filter 766. In addition, the format reader 764 executes instructions to retrieve an audio component stream 102, a video component stream 104, and a script component stream 108 from the presentation stream 754 or presentation file 756 and to deliver these component streams to a browser 758 or multimedia player 760. The web component stream rendering filter 766 executes instructions to retrieve individual media samples 110 from the retrieved web component stream 106. The web component stream rendering filter 766 further executes instructions to deliver the retrieved media samples 110 to a cache 768. A player control 762 that is embedded in the browser 758 or multimedia player 760 executes instructions to receive a rendering sample 112, which includes rendering commands for the retrieved media samples 110. Responding to the rendering commands, the player control 762 further executes instructions to retrieve the media samples 110 from the cache 768 and to render the media samples 110 on the browser 758 or multimedia player 760. As the browser 758 or the multimedia player 760 executes instructions to render the media samples 110, rendering commands that are included in the rendering sample 112 execute instructions to coordinate synchronization between the media samples 110, the audio component stream 102, and the video component stream 104.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for use with a media server connected to a network having communication channels, said method comprising: transmitting from the media server over one of the communication channels of the network a data signal having a data field encoded therein, said data field comprising web content data in a streaming media format, said web content data comprising a web component stream, each said stream having an assigned bandwidth assigned by a content author, said web component stream comprising a media sample, wherein said media sample comprises a header and media data, said header comprising:
    a tag indicating a rendering time in a rendering command in a rendering sample encoded in the web component stream of the media sample, and
    a tag indicating a pre-roll time of the media sample.

2. A method for use with a media server connected to a network having communication channels, said method comprising: transmitting from the media server over one of the communication channels of the network a data signal having a data field encoded therein said data field comprising web content data in a streaming media format, said web content data comprising a web component stream, each said stream having an assigned bandwidth assigned by a content author, said web component stream comprising a media sample, wherein said media sample comprises a header and media data, said header comprising a tag indicating a rendering time in a rendering command in a rendering sample encoded in the web component stream of the media sample, and a tag indicating a pre-roll time of the media sample, wherein said web component stream comprises clean points representing key frames for the web content data, or comprises a plurality of media samples wherein said media samples have a constant bandwidth and are contiguous to each other.

3. The data signal of claim 1, wherein said web content data is encoded in a plurality of web component streams, each having an assigned bandwidth assigned by a content author, wherein an additional component stream comprising additional data other than web content data accompanies the web component stream, and wherein said additional data includes multiple languages in separate component streams wherein each of the separate component streams corresponds to one of the multiple languages, and wherein said additional data is encoded in a plurality of component streams, each having an assigned bandwidth assigned by a content author.

4. A computer executable method for authoring and encoding on a computer a web component stream comprising a media sample, said method comprising computer executable instructions for:

setting on the computer a rendering time for the media sample;

setting on the computer a pre-roll time for the media sample;

formatting on the computer the media sample into a web component stream as a function of the set rendering time and the set pre-roll time wherein said web component stream has a constant aggregate assigned bandwidth assigned by the content author; and calculating on the computer a send time for the media sample and wherein the web component stream is a function of the calculated send time.

5. The method of claim 4, further comprising setting a constant bandwidth for the media sample, assigning a uniform resource locator to the media sample, breaking the media sample into pieces, wherein each piece of said media sample comprises a header, said header comprising a tag indicating that said piece is part of said media sample, said web component stream comprises a plurality of media samples forming a web content data, and farther comprising including clean points in the web component stream to represent key frames for the web content data.

6. The method of claim 4, further comprising encoding said media sample in a plurality of web component streams, each having an assigned bandwidth assigned by a content author and encoding said media sample in separate web component streams wherein each of the separate web component streams corresponds to one of multiple languages.

7. The method of claim 4, further comprising issuing a rendering command for the media sample, said rendering command comprising the rendering time for the media sample, encoding the rendering command for the media sample in a rendering sample, and encoding said rendering sample in the web component stream following the media sample in a time line.

8. The method of claim 4, further comprising encoding additional data other than web content data in an additional component stream, encoding said additional data in a plurality of component streams, each having an assigned bandwidth assigned by a content author and encoding said additional data in separate component streams wherein each of the separate component streams corresponds to one of multiple languages.

9. The method of claim 4, further comprising combining said web component stream into a combined presentation stream and redundantly streaming said combined presentation stream to a media server or combining said web component stream and an additional component stream comprising additional data other than web content data into a combined presentation stream and redundantly streaming said combined presentation stream to a media server.

10. The method of claim 4, further comprising separately streaming said web component stream and/or an additional component stream comprising additional data other than web content data to a media server and grouping said web component stream into a presentation file.

11. One or more computer-readable storage media having computer-executable instructions for performing the method of claim 4.

* * * * *